US010464674B2

(12) United States Patent
Grant

(10) Patent No.: US 10,464,674 B2
(45) Date of Patent: Nov. 5, 2019

(54) INTERACTIVE SIDEWALL DISPLAY SYSTEM AND METHOD

(71) Applicant: BOMBARDIER INC., Dorval (CA)

(72) Inventor: Robert Grant, Toronto (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/165,482

(22) Filed: Oct. 19, 2018

(65) Prior Publication Data
US 2019/0047709 A1 Feb. 14, 2019

Related U.S. Application Data

(63) Continuation of application No. 15/320,925, filed as application No. PCT/IB2015/054039 on May 28, 2015, now Pat. No. 10,131,431.

(60) Provisional application No. 62/015,668, filed on Jun. 23, 2014.

(51) Int. Cl.
| B64D 11/00 | (2006.01) |
| G06F 3/0484 | (2013.01) |
| G06F 3/14 | (2006.01) |
| G06F 3/0481 | (2013.01) |

(52) U.S. Cl.
CPC ........ *B64D 11/0015* (2013.01); *G06F 3/0481* (2013.01); *G06F 3/04847* (2013.01); *G06F 3/1446* (2013.01); *G06F 3/1454* (2013.01); *B64D 2011/0061* (2013.01); *G06F 2203/04803* (2013.01); *G09G 2340/04* (2013.01); *G09G 2380/10* (2013.01); *G09G 2380/12* (2013.01)

(58) Field of Classification Search
None
See application file for complete search history.

(56) References Cited

U.S. PATENT DOCUMENTS

| 6,101,431 | A | 8/2000 | Niwa et al. |
| 6,628,321 | B1 | 9/2003 | Nutaro |
| 7,070,150 | B2 | 7/2006 | Jones et al. |
| 8,116,975 | B2 | 2/2012 | Stavaeus et al. |
| 8,723,859 | B1 | 5/2014 | Hirsch et al. |
| 10,131,431 | B2 * | 11/2018 | Grant ................ B64D 11/0015 345/1.3 |
| 2004/0095316 | A1 | 5/2004 | Shibamiya et al. |
| 2004/0217234 | A1 | 11/2004 | Jones et al. |
| 2004/0217976 | A1 | 11/2004 | Sanford |
| 2010/0014009 | A1 | 1/2010 | Stavaeus et al. |
| 2011/0162016 | A1 | 6/2011 | Petrisor et al. |
| 2012/0212613 | A1 | 8/2012 | Yamaguchi et al. |

(Continued)

FOREIGN PATENT DOCUMENTS

EP  0913325  5/1999

OTHER PUBLICATIONS

Claudine Zap, "Planned supsersonic jet will have a windowless cabin", Compass, Feb. 20, 2014, https://www.yahoo.com/style/bp/planned-supsersonic-jet-windowless-cabin-230001687.html.

(Continued)

*Primary Examiner* — Kenneth B Lee, Jr.
(74) *Attorney, Agent, or Firm* — Norton Rose Fulbright Canada LLP

(57) ABSTRACT

There is described a system and method for setting virtual boundaries on an interactive sidewall display system in a vehicle, the virtual boundaries defining individual passenger-specific regions for user interaction.

19 Claims, 12 Drawing Sheets

(56) References Cited

U.S. PATENT DOCUMENTS

| | | |
|---|---|---|
| 2012/0325962 A1 | 12/2012 | Barron |
| 2013/0038631 A1 | 2/2013 | DeMers et al. |
| 2013/0169807 A1 | 7/2013 | De Carvalho et al. |
| 2014/0085337 A1* | 3/2014 | Velten ............... B64D 11/0015 345/635 |

OTHER PUBLICATIONS

"Royal Caribbean will roll virtual balconies out to Navigator of the Seas first", Royal Caribbean Blog, Apr. 17, 2013, http://www.royalcaribbeanblog.com/2013/04/17/royal-caribbean-will-roll-virtual-balconies-out-navigator-seas-first.

Howe et al., "Designing for Virtual Windows in a Deep Space Habitat" American Institute of Aeronautics and Astronautics, 2013, pp. 1-9, US.

International Search Report and Written Opinion dated Aug. 13, 2015 in connection with Internationa Patent Application No. PCT/IB2015/054039.

The State Intellectual Property Office of the People'S Republic of China, Notification of First Office Action dated Apr. 11, 2018 re: application No. 201580033538.5.

\* cited by examiner

INTERACTIVE SIDEWALL DISPLAY SYSTEM AND METHOD

CROSS-REFERENCE TO RELATED APPLICATIONS

This application is a continuation of U.S. patent application Ser. No. 15/320,925, which claims the benefit of U.S. Provisional Patent application No. 62/015,668 filed Jun. 23, 2014, entitled "Interactive Sidewall Display System And Method", the entire contents of which are hereby incorporated by reference.

TECHNICAL FIELD

The present invention relates to the field of display devices in vehicles and more particularly, to display devices that are interactive for passengers.

BACKGROUND OF THE ART

A structural window in an aircraft has been the standard to enable occupants to view the exterior environment. As technology evolves, there is significant interest in replacing structural windows in aircrafts with digital wall panels that can act as interactive digital displays.

However, certain technical challenges arise when considering the actual implementation in vehicles such as aircrafts and trains, especially when passenger interaction is an objective.

SUMMARY

There is described a system and method for dynamically setting boundaries on an interactive sidewall display system in a vehicle, the boundaries defining individual passenger-specific regions for user interaction.

In accordance with a first broad aspect, there is provided interactive sidewall display system. The system comprises at least one display device extending along an inner sidewall of a vehicle and spanning at least two seats disposed in successive rows, the display device being responsive to input commands from passengers for displaying information and images thereon. A control module is operatively connected to the at least one display device and configured to set at least one virtual boundary for the at least one display device, the virtual boundary defining user-specific regions for passenger interaction with the display device.

In some embodiments, the control module is configured to determine a seat pitch between the successive rows and set the at least one virtual boundary as a function of the seat pitch. The control module may also be configured to receive as input a seat pitch between the successive rows, and set the at least one virtual boundary as a function of the seat pitch as received. The control module may be configured to receive as input one of a selection of seats defining a zone and a zone comprising a set of pre-selected seats, and a seat pitch for seats of the zone, and set the at least one virtual boundary as a function of the seat pitch for the zone.

In some embodiments, the control module may be configured to apply virtual boundaries to a plurality of zones in the vehicle, each one of the zones defining a set of seats, wherein the virtual boundaries in a first zone define regions of a size that differs from the virtual boundaries in a second zone. The first zone may comprise a plurality of successive rows, wherein the second zone is adjacent to the first zone and comprises a single row, and a third zone adjacent to the second zone comprises a plurality of successive rows, the virtual boundaries in the first and the third zones defining regions of a size that differs from the virtual boundaries in the second zone. In some embodiments, at least two of the plurality of zones span a same display device.

In some embodiments, the at least one display device comprises a plurality of display devices and the control module is configured to receive as input a selected display device from the plurality of display devices for applying the at least one virtual boundary thereto. Alternatively or in combination therewith, the at least one display device and the control module may comprise wireless transmission means for communicating together. In addition, the control module may be configured to display borders on the display device at the at least one virtual boundary to visually define the user-specific regions.

In some embodiments, the at least one virtual boundary is a substantially vertical boundary that separates the display device into the user-specific regions.

In accordance with another broad aspect, there is provided a method for providing an interactive sidewall display system. The method comprises extending at least one display device along an inner sidewall of a vehicle to span at least two seats disposed in successive rows, the display device being responsive to input commands from passengers for displaying information and images thereon; operatively connecting a control module to the at least one display device; and setting at least one virtual boundary on the at least one display device from the control module, the at least one virtual boundary defining user-specific regions for passenger interaction.

In some embodiments, dynamically setting the at least one virtual boundary comprises setting the at least one virtual boundary as a function of a seat pitch between the successive rows.

In some embodiments, the method further comprises inputting a seat pitch between the successive rows, and setting the at least one virtual boundary as a function of the seat pitch.

In some embodiments, the method further comprises inputting one of a selection of seats defining a zone and a zone comprising a set of pre-selected seats, and a seat pitch between the successive rows of the zone, and setting the at least one virtual boundary as a function of the seat pitch for the zone.

In some embodiments, setting the at least one virtual boundary comprises applying virtual boundaries to a plurality of zones in the vehicle, each one of the zones defining a set of seats in successive rows, wherein the virtual boundaries in a first zone define regions of a size that differs from the virtual boundaries in a second zone. The first zone may comprise a plurality of successive rows, wherein the second zone is adjacent to the first zone and comprises a single row, and a third zone adjacent to the second zone comprises a plurality of successive rows, the virtual boundaries in the first and the third zones defining regions of a size that differs from the virtual boundaries in the second zone. In some embodiments, at least two of the plurality of zones span a same display device.

In some embodiments, extending at least one display device comprises extending a plurality of display devices and further comprising inputting a selected display device from the plurality of display devices to the control module for applying the at least one virtual boundary thereto.

In some embodiments, operatively connecting a control module to the at least one display device comprises connecting the control module and the at least one display device wirelessly.

In some embodiments, the method further comprises displaying borders on the display device at the at least one virtual boundary to visually define the user-specific regions.

In some embodiments, the at least one virtual boundary is a substantially vertical boundary that separates the display device into the user-specific regions.

In accordance with yet another broad aspect, there is provided a method for providing an interactive sidewall display system having at least one display device extending along an inner sidewall of a vehicle and spanning at least two seats disposed in successive rows, the at least one display device being responsive to input commands from passengers for displaying information and images thereon. The method comprises setting at least one virtual boundary on the at least one display device from a control module operatively connected to the at least one display device, the at least one virtual boundary defining user-specific regions for passenger interaction.

In this specification, the examples illustrate an interactive sidewall display system in an aircraft. It should be understood that the system may also be provided in other vehicles having successive rows of seats along a sidewall, such as trains, buses, subway cars, limousines, and other automobiles.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
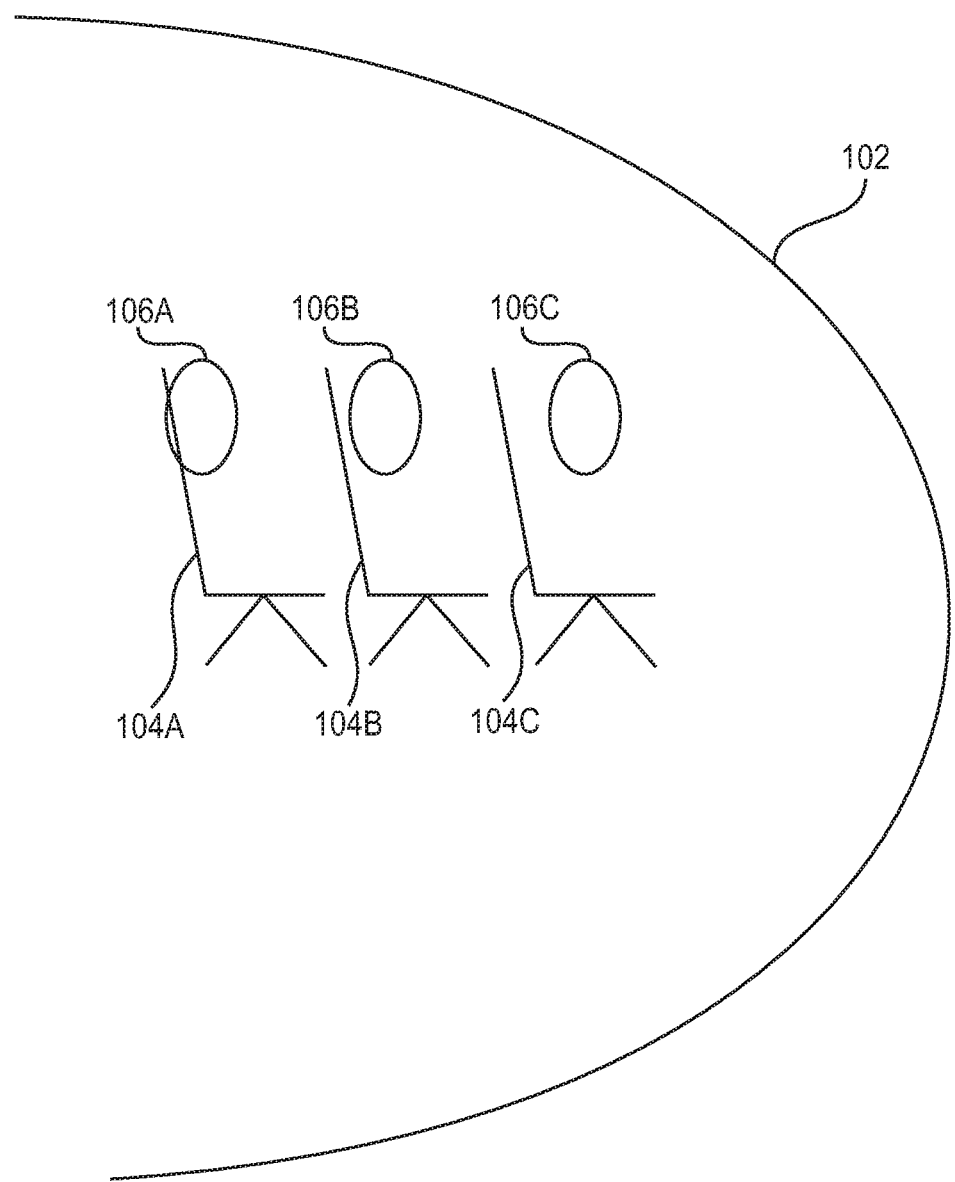
FIG. 1 is a schematic illustration of an aircraft as per the prior art.

FIG. 1 is a schematic illustration of a cross-sectional side view of an aircraft 102 as per the prior art. Seats 104a, 104b, 104c are provided in successive rows. Structural windows 106a, 106b, 106c are provided in the aircraft frame and consist of structural external and internal components that allow a passenger to see outside during flight. The windows 106a, 106b, 106c are spaced in accordance with a predetermined setting defined by the aircraft manufacturer and as such, do not necessarily align with each row of seats 106a, 106b, 106c. This is especially true when the aircraft 102 comprises varied spacing between seats, also known as pitch. The seat pitch may vary as a function of various criteria, such as travel class (i.e. economy, business, or first class), the presence of an exit, and other physical limitations.

Figure 2:
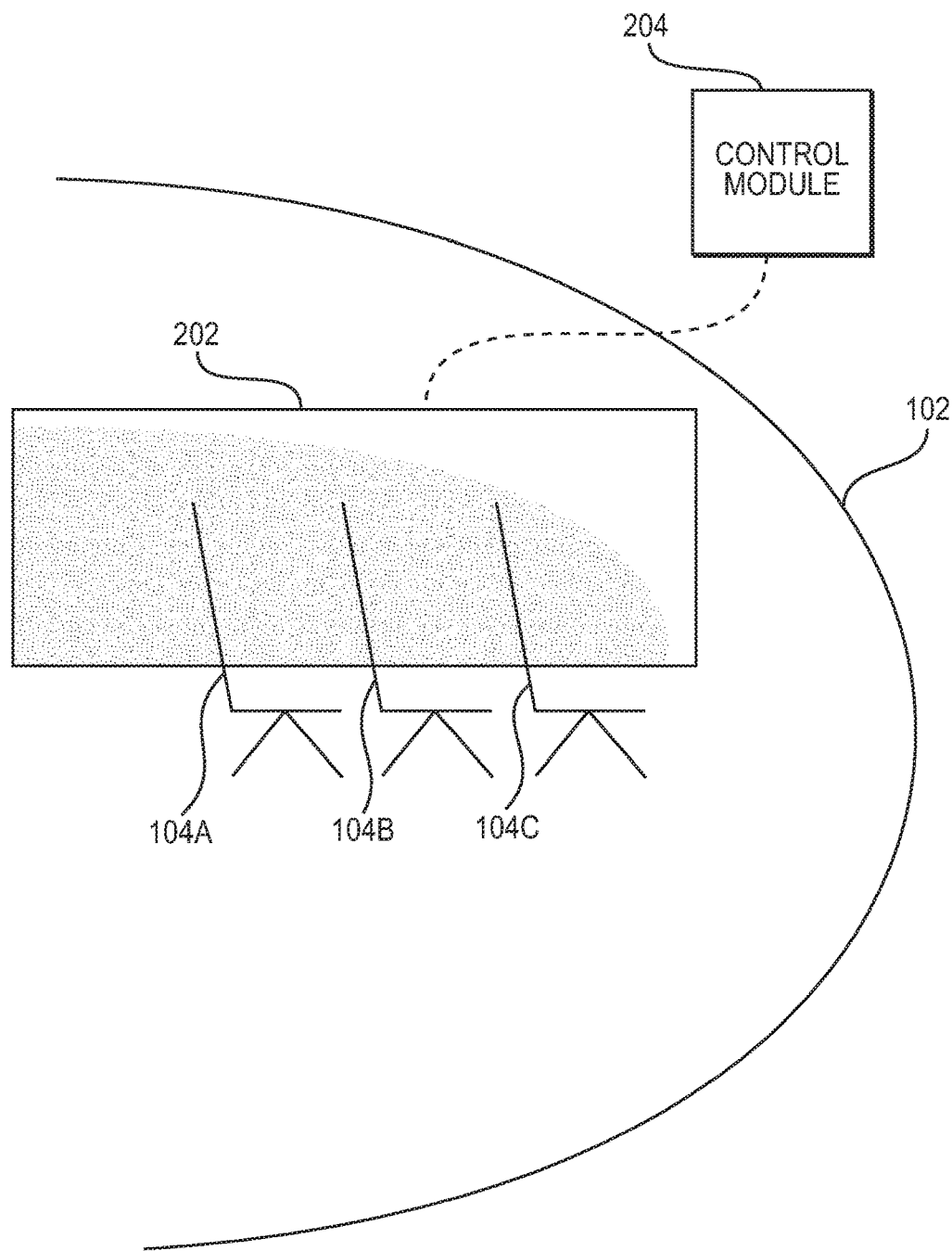
FIG. 2 is a schematic illustration of an aircraft with an interactive sidewall display system, in accordance with one embodiment.

FIG. 2 schematically illustrates the aircraft 102 with the windows 106a, 106b, 106c having been replaced or covered by a display device 202. The display device 202 extends along an inner sidewall of the aircraft and spans at least two of the seats 106a, 106b, 106c. In the Figure shown, the display device 202 spans along the plurality of seats 106a, 106b, 106c. In some embodiments, the display device 202 is embedded in the sidewall of the aircraft 202. Alternatively, the display device 202 is a pull-down display that selectively covers the structural windows. The display device 202 may be made of a flexible material that mates with the curved surface of the sidewall of the aircraft 102, or it may be a more rigid structure with spacing provided between the display device 202 and the aircraft fuselage.

Although the Figures shown herein describe the invention in the context of an aircraft 102, as previously indicated, the present invention is equally as applicable to other transportation vehicles, such as trains, buses, subway cars, limousines, and other automobiles, for example.

The display device 202 is adapted for presentation of information (including text and images) in visual form and may be provided using various technologies, such as, but not limited to, Light-emitting diodes (LEDs), Liquid Crystal Displays (LCD), Organic light-emitting diodes (OLEDs), surface-conduction electron-emitter display (SED), plasma display panel (PDP), electroluminescent display (ELD), and laser video display. In some embodiments, the display device 202 is controlled via any one of touch, gestures, and sound. For example, the display device 202 may be a touchscreen responsive to input from a finger, a stylus, and/or a specially coated glove. Alternatively, the display device 202 is controlled by a mouse, touchpad, or any other intermediate input device that may be used to control what is displayed and how it is displayed.

A control module 204 is operatively connected to the display device 202. This connection may be wired or wireless. A wireless connection may be provided through various types of networks, such as Wi-Fi, Cellular, Personal Area Network, and the Internet, or using various wireless technologies such as Radio Frequency, Bluetooth, and Infrared. The display device 202 may be powered using its own power source, such as a battery, it may be connected directly into the power source (or electrical system) of the aircraft 102, or it may use alternative power source such as solar power. The control module 204 may be a stand-alone apparatus provided anywhere within the vehicle, such as at the front or back with the pilot or the flight crew. Alternatively, the control module 204 may be integrated within an existing system onboard of the vehicle, such as a flight management system or a control system for inflight entertainment (IFE). Also alternatively, the control module 204 may reside on an electronic device (not shown), such as a laptop computer, a personal digital assistant (PDA), a smartphone, a tablet or the like, adapted to communicate over a wireless network with the display device 202. The control module 204 may be provided in part or in its entirety directly on the electronic device as a native application, or as a web application.

Figure 3:
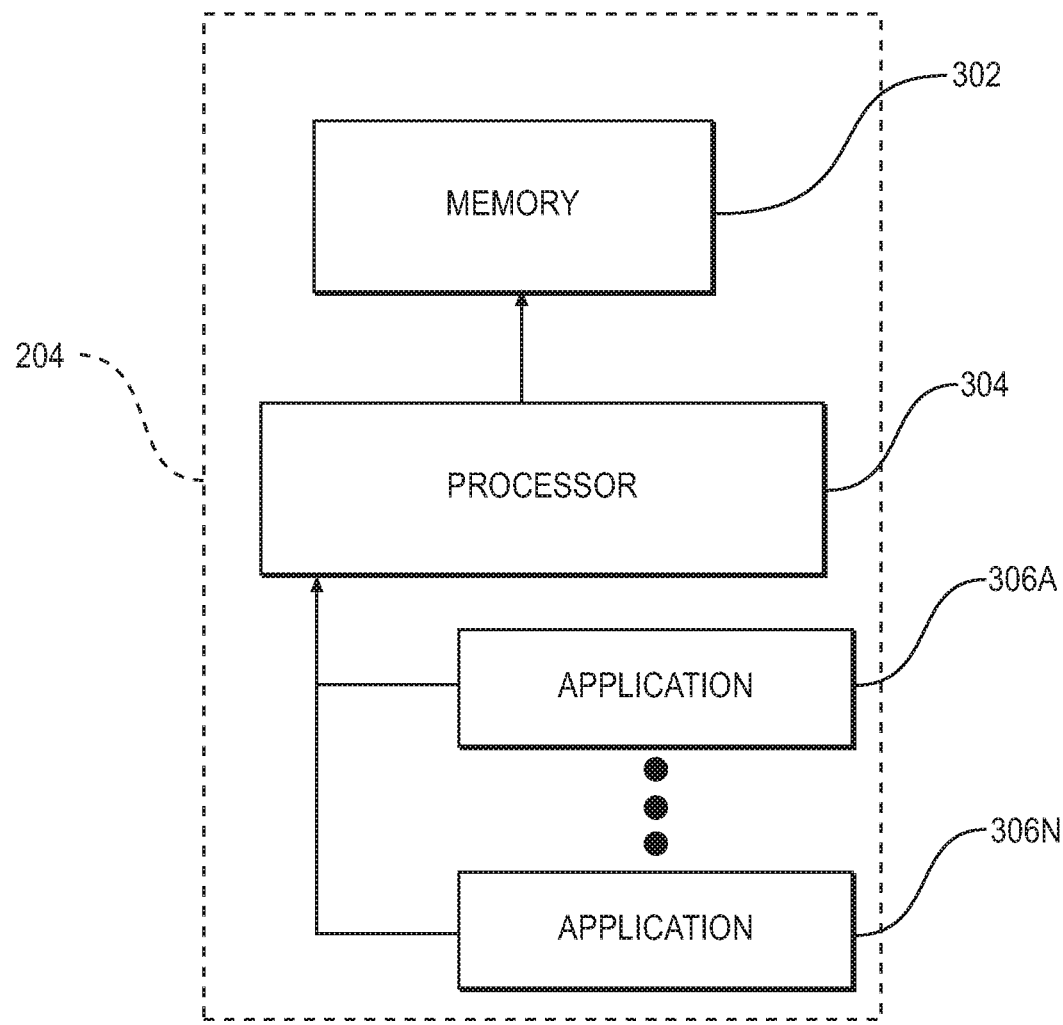
FIG. 3 is a block diagram of an exemplary embodiment for a control module.

FIG. 3 illustrates an exemplary embodiment for the control module 204. The control module 204 may comprise, amongst other things, a processor 304 in data communication with a memory 302 and having a plurality of applications 306a, . . . , 306n running thereon. The processor 304 may access the memory 302 to retrieve data. The processor 304 may be any device that can perform operations on data. Examples are a central processing unit (CPU), a microprocessor, and a front-end processor, among other possibilities.

The applications 306a, . . . , 306n are coupled to the processor 304 and configured to perform various tasks. In particular, the application 306a may be configured to dynamically set virtual boundaries on the display device 202 from the control module 204 operatively connected thereto. It should be understood that while the applications 306a, . . . , 306n presented herein are illustrated and described as separate entities, they may be combined or separated in a variety of ways. An operating system (not shown) may be used as an intermediary between the processor 304 and the applications 306a, . . . , 306n. Cloud computing may also be used such that the control module 204 is provided partially or entirely in the cloud. In some embodiments, the application 306a may be downloaded directly onto the electronic devices and application 306n communicates with application 306a via a network.

The memory 302 accessible by the processor 304 may receive and store data, such as settings for the display device 202, or registered passenger/user preferences to be retrieved by an external database. The memory 302 may be a main memory, such as a high speed Random Access Memory (RAM), or an auxiliary storage unit, such as a hard disk or flash memory. The memory 302 may be any other type of memory, such as a Read-Only Memory (ROM), Erasable Programmable Read-Only Memory (EPROM), or optical storage media such as a videodisc and a compact disc.

Figure 4A:
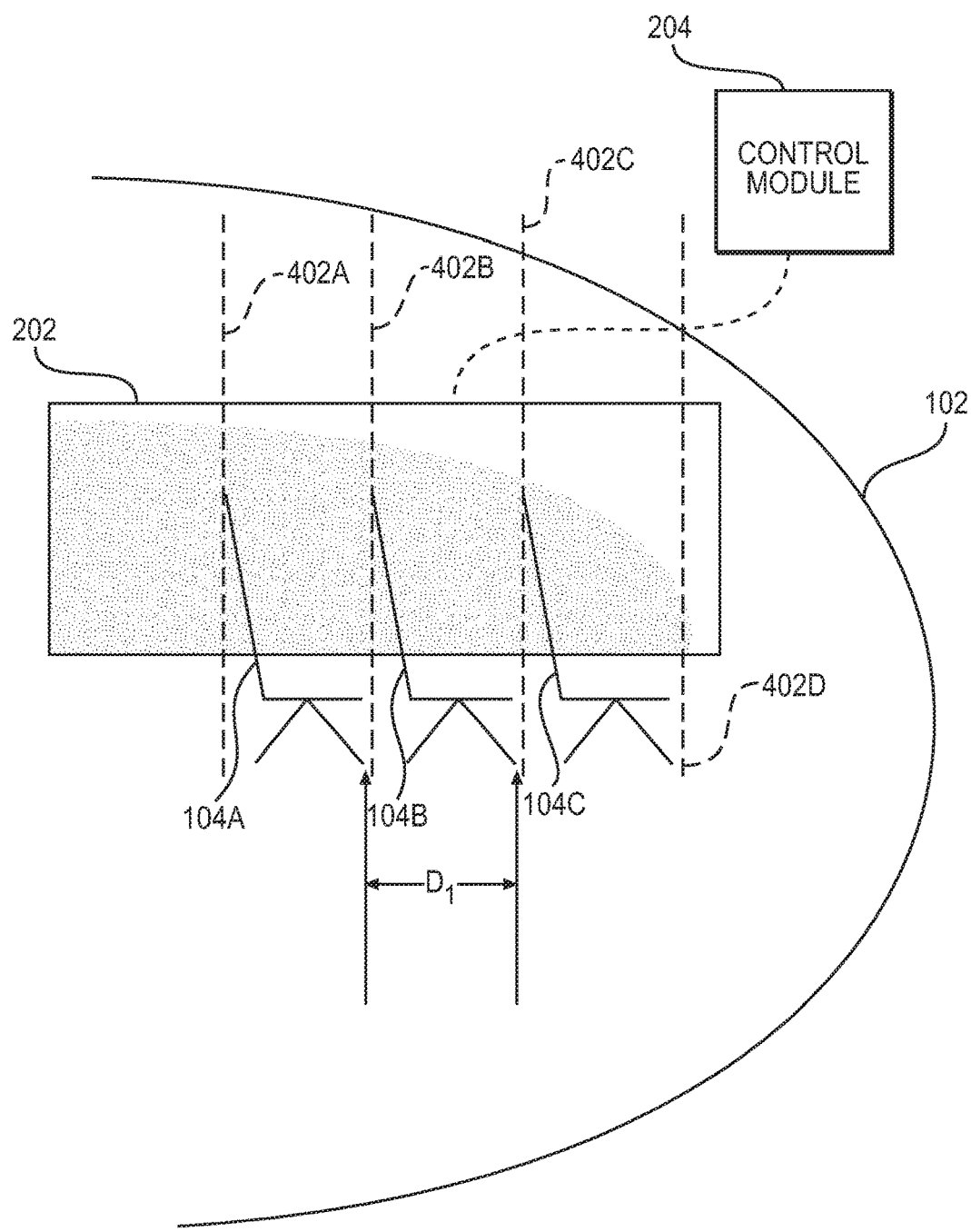
FIG. 4a is a schematic illustration of virtual boundaries being set in accordance with a seat pitch $D_1$, in accordance with one embodiment.

Referring now to FIG. 4a, there is illustrated an interactive sidewall display system comprising the display device 202 and the control module 204. In order to allow each passenger having a window seat his or her own user-defined (i.e. passenger-defined) area for interaction with the display device 202, the control module 204 is configured to set virtual boundaries on the display device 202. The virtual boundaries define user-specific regions for passenger interaction, that may, in accordance with some embodiments be set according to seat pitch. The user-specific regions are set to correspond to the area surrounding a passenger, from the backseat of the row ahead to his or her own backseat. Virtual boundaries 402a, 402b, 402c, 402d are aligned with the rows of seats 104a, 104b, 104c to ensure maximum display regions for each passenger. In an alternative example, the virtual boundaries may not be set to provide maximum display regions, and may instead be set so that adjacent regions to not abut against each other. In other words, it is possible to have a small "dead zone" between two adjacent regions so that there is a small buffer of space between adjacent regions in which passengers cannot interact with the display device 202. This may provide some viewing privacy between each user-specific region.

Figure 4B:
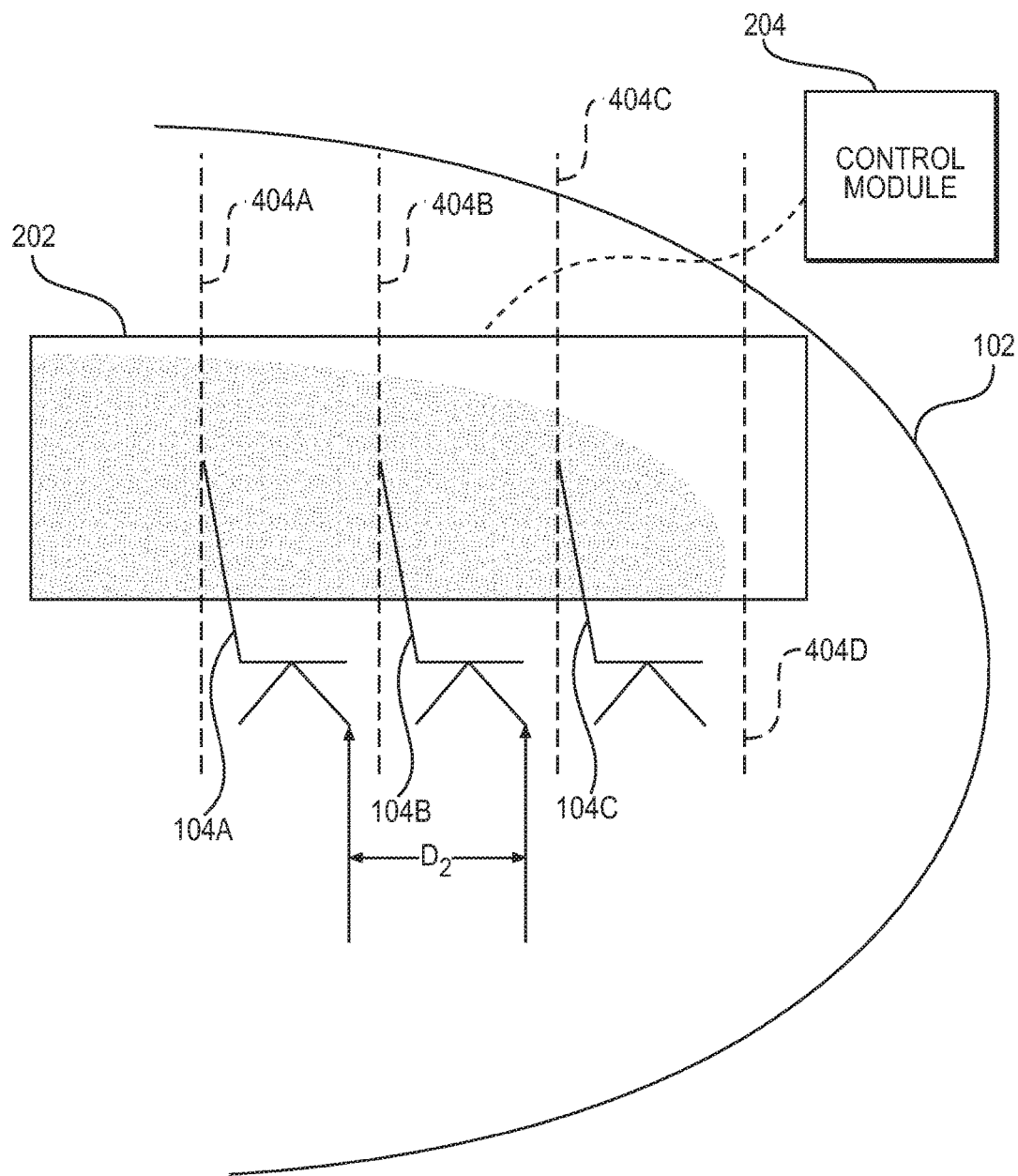
FIG. 4b is a schematic illustration of virtual boundaries being set in accordance with a seat pitch $D_2 > D_1$, in accordance with one embodiment.

In some embodiments, the virtual boundaries 402a, 402b, 402c, 402d are set as a function of seat pitch, which refers to the space between a point on one seat and the same point on the seat in front of it. In FIG. 4a, the seat pitch is set to $D_1$, measured as the distance between the front stud of a seat and the front stud of the seat in front of it. The virtual boundaries 402a, 402b, 402c, 402d are thus set accordingly. FIG. 4b illustrates an embodiment with a seat pitch of $D_2 > D_1$. The virtual boundaries 404a, 404b, 404c, 404d are thus set to positions which are more spaced apart than those provided by virtual boundaries 402a, 402b, 402c, 402d and the user-specific regions have a greater width.

In some embodiments, the control module 204 is configured to determine the seat pitch between successive rows and set the boundaries accordingly. This may be done using sensors provided in the fuselage to automatically collect data that may be interpreted to determine seat pitch. Alternatively, the control module 204 may access information regarding specifications of the aircraft 204 and extract seat pitch information therefrom. This information may be provided in the aircraft's onboard maintenance system or other onboard system. Also alternatively, the data may be accessed online and retrieved from a remote location.

In some embodiments, the control module 204 is configured to receive as input the seat pitch between the successive rows and set the boundaries accordingly. The seat pitch information may be input using a variety of input devices, such as a touch screen, a keypad, a mouse, etc. Available seat pitches may have been pre-programmed into the system and inputting the seat pitch comprises making a selection from the list of possible seat pitches. For example, an aircraft may be configured to have a pre-determined set of seating configurations that are possible within the aircraft, and seat pitch information corresponding to each of the pre-determined seating configurations may be stored within the memory 302 to be selected by an operator of the control module 204.

In other embodiments, the virtual boundaries 402a, 402b, 402c, 402d are set as a function of other criteria, such as human ergonomic factors relating to the portion of the side wall that can be comfortably touched by a passenger when sitting in the seat, or the distance between a seat's passenger-facing surface and the rear of the seat in front. There are a variety of different criteria that could be used for setting the virtual boundaries 402a, 402b, 402c, 402d that would be apparent to a person of skill in the art. For example, a seat configuration having facing seats may consider other criteria for providing a user-specific region to each passenger.

Similarly, the virtual boundaries 402a, 402b, 402c, 402d may be set only in a horizontal direction, as illustrated in FIGS. 4A and 4B, with the virtual boundaries 402a, 402b, 402c, 402d delineating the separation between adjacent passenger defined areas for interaction with the display device 202. However, in an alternative embodiment, virtual boundaries may also be set in the vertical direction, such that there may be an upper ceiling to the region defining the passenger's area for interaction with the display device 202. Likewise, there could also be a bottom virtual boundary.

Figure 5:
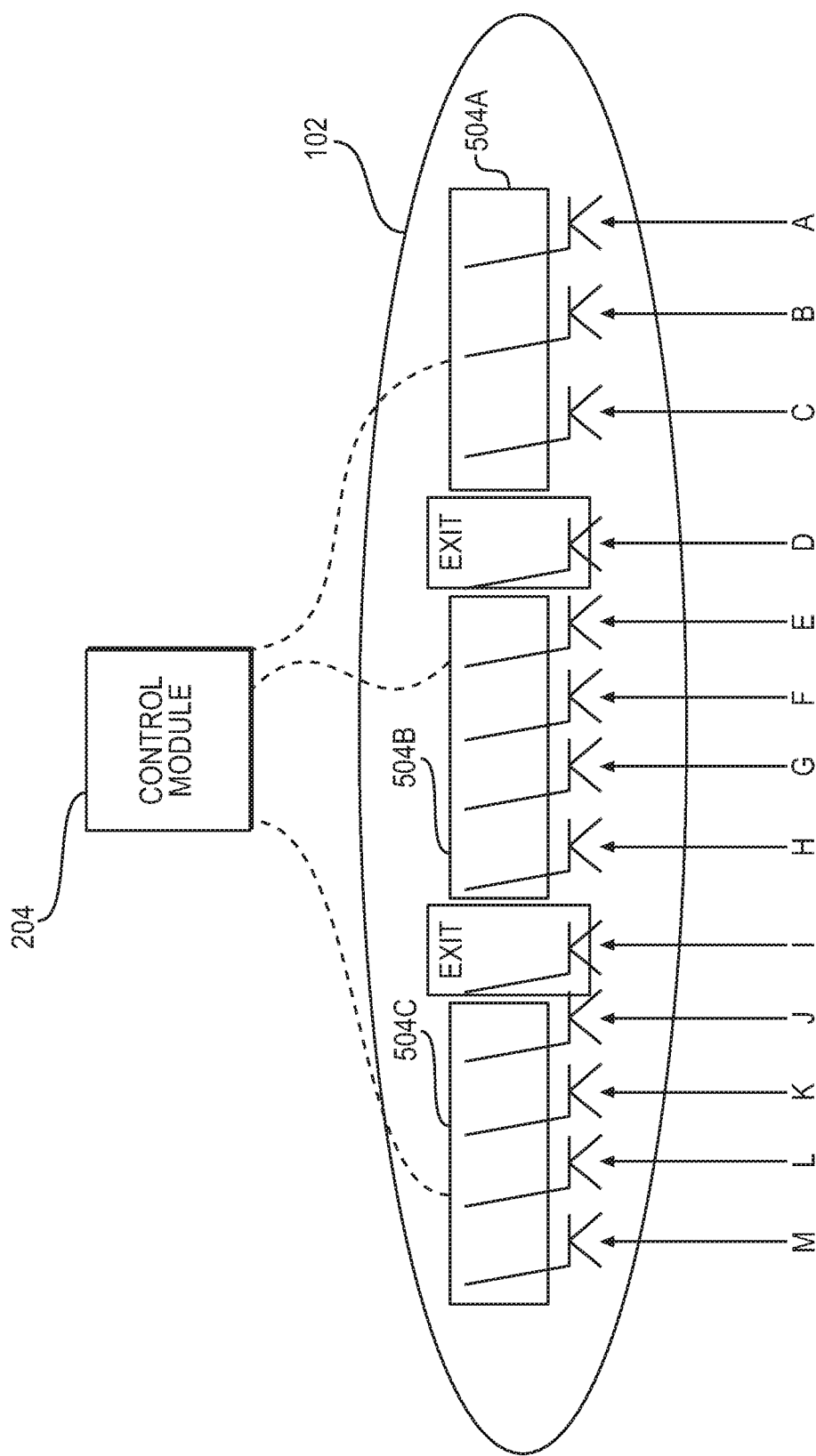
FIG. 5 is a schematic illustration of an interactive sidewall display system having multiple display devices, in accordance with one embodiment.

As illustrated in FIG. 5, there may be a plurality of display devices 504a, 504b, 504c in a same aircraft 102 and therefore, one of the inputs provided to the control module 204 may be which of the display devices 504a, 504b, 504c the virtual boundaries are being set for. In the example of FIG. 5, rows A to C are in first class, row D is an exit row, and rows E to H and J to M are economy class rows separated by another exit row I. The seat pitch thus varies throughout the aircraft 102 and the virtual boundaries may be set dynamically as a function of seat pitch. An exit row may or may not have a portion of the display device, depending on whether the device is pull-down or embedded within the sidewall.

In some embodiments, the virtual boundaries are set for each row independently. In other embodiments, multiple rows of a same seat pitch are grouped into zones and the virtual boundaries are set per zone. For example, rows A to C may correspond to Zone A, row D may correspond to Zone B, rows D to H may correspond to Zone C, row I may correspond to Zone D, and rows J to M may correspond to Zone E. In an alternative embodiment, a zone comprises rows that have a same seat pitch but are not necessarily successive. For example, rows A to C may correspond to Zone A, rows D and I may correspond to Zone B, and rows E to H and J to M may correspond to Zone C. Other grouping configurations for zones may also be provided. In these embodiments, the control module 204 is configured to receive as input either a selection of seats defining a zone or a selected zone comprising a set of pre-selected seats. The seat pitch for the zone may also be provided as input or determined automatically once the zone has been selected/defined.

Figure 6:
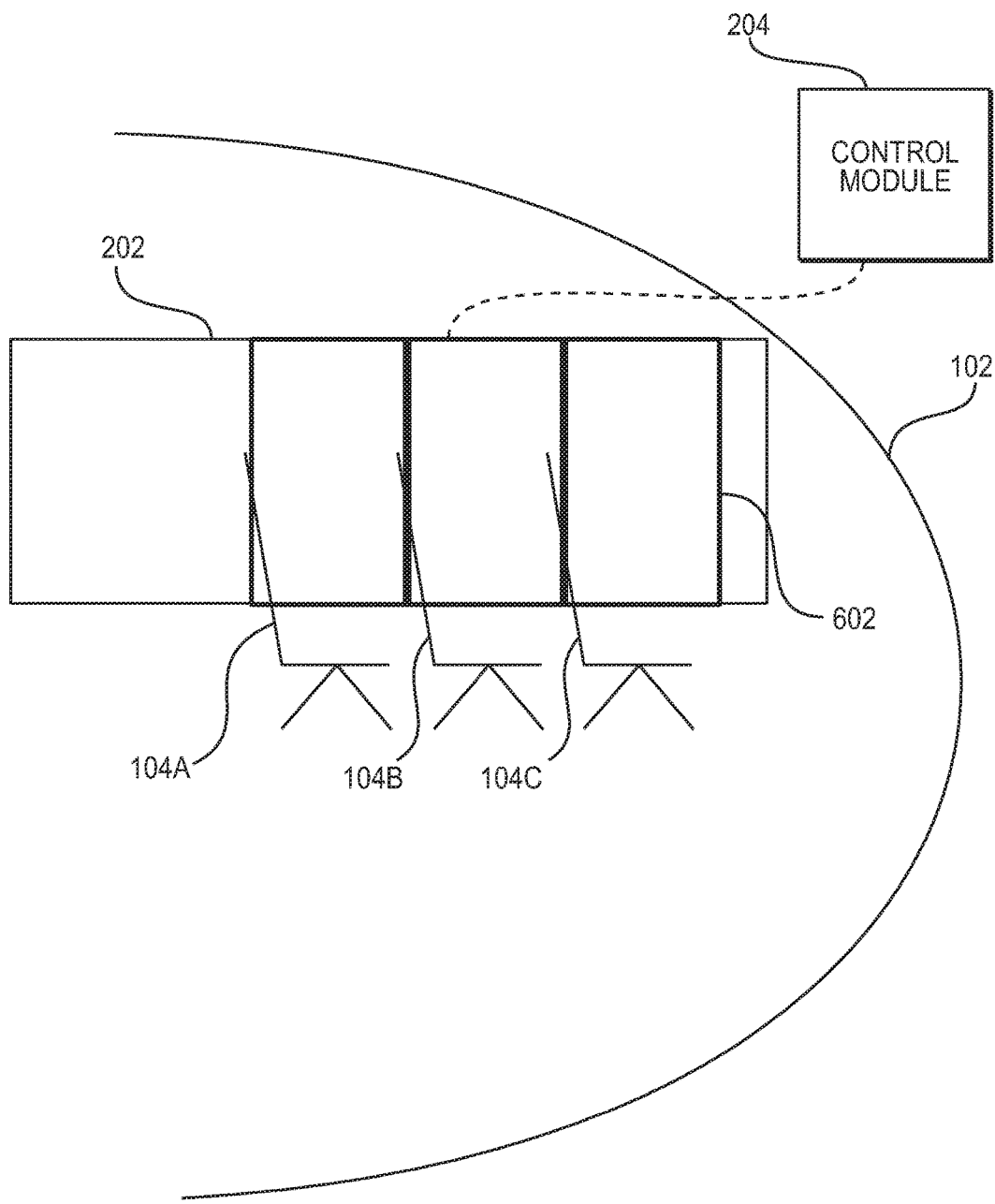
FIG. 6 is a schematic illustration of virtual boundaries displayed as borders on the display device, in accordance with one embodiment.

FIG. 6 illustrates an embodiment whereby the control module 204 is configured to display borders 602 on the display device 202 in order to visually define the user-specific regions. The borders 602 may be generated to mimic actual joints in sidewalls typically found in aircrafts. Alternatively, the borders may be set as narrow or broad lines that frame each user-specific region. A color and/or motif may be set as desired by a crew member via the control module 204 or by a passenger via the display device 202.

In some embodiments, the display device 202 may display virtual windows 702a, 702b, 702c in the user-specific regions, as illustrated in FIGS. 7a to 7d. The entire display device 202 may be set to display a virtual wall with a set of virtual windows 702a, 702b, 702c that can display user selectable images within the virtual window's viewing pane. For example, the virtual windows 702a, 702b, 702c may display an outside environment, with a view having been pre-recorded or corresponding to a view as captured from a camera 704 mounted on the exterior of the aircraft 102. The control module 204 may be configured to display the virtual windows 702a, 702b, 702c at a predetermined position within each user-specific region to ensure that the virtual windows 702a, 702b, 702c are properly aligned with the seats 104a, 104b, 104c throughout the aircraft. The position of the virtual windows 702a, 702b, 702c may be central within the user-specific regions, or it may be offset from the center to optimize a viewing position for the passenger.

Figure 7A:
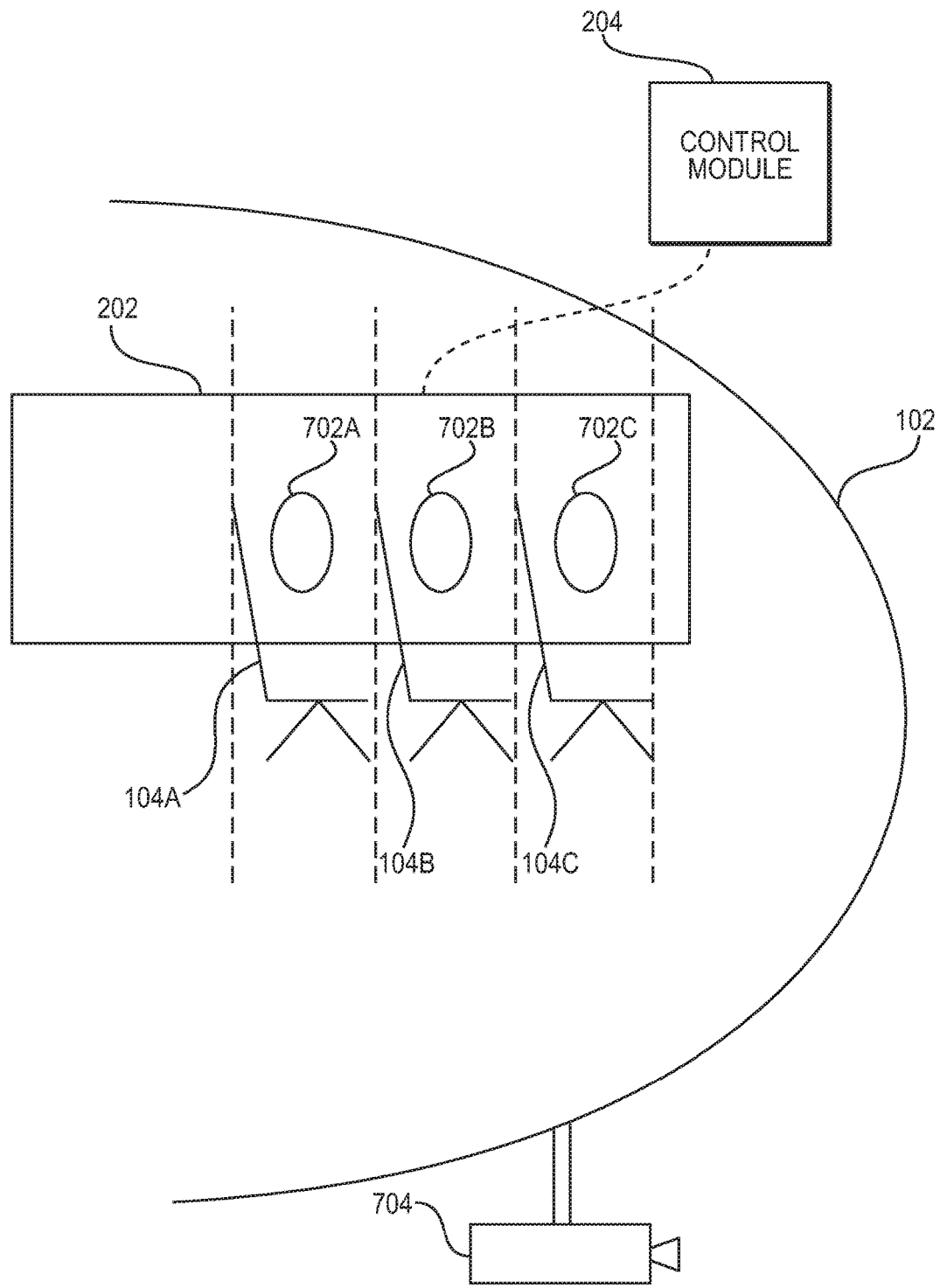
FIG. 7a is a schematic illustration of virtual windows provided on the display device in between the virtual boundaries, in accordance with one embodiment.
Figure 7B:
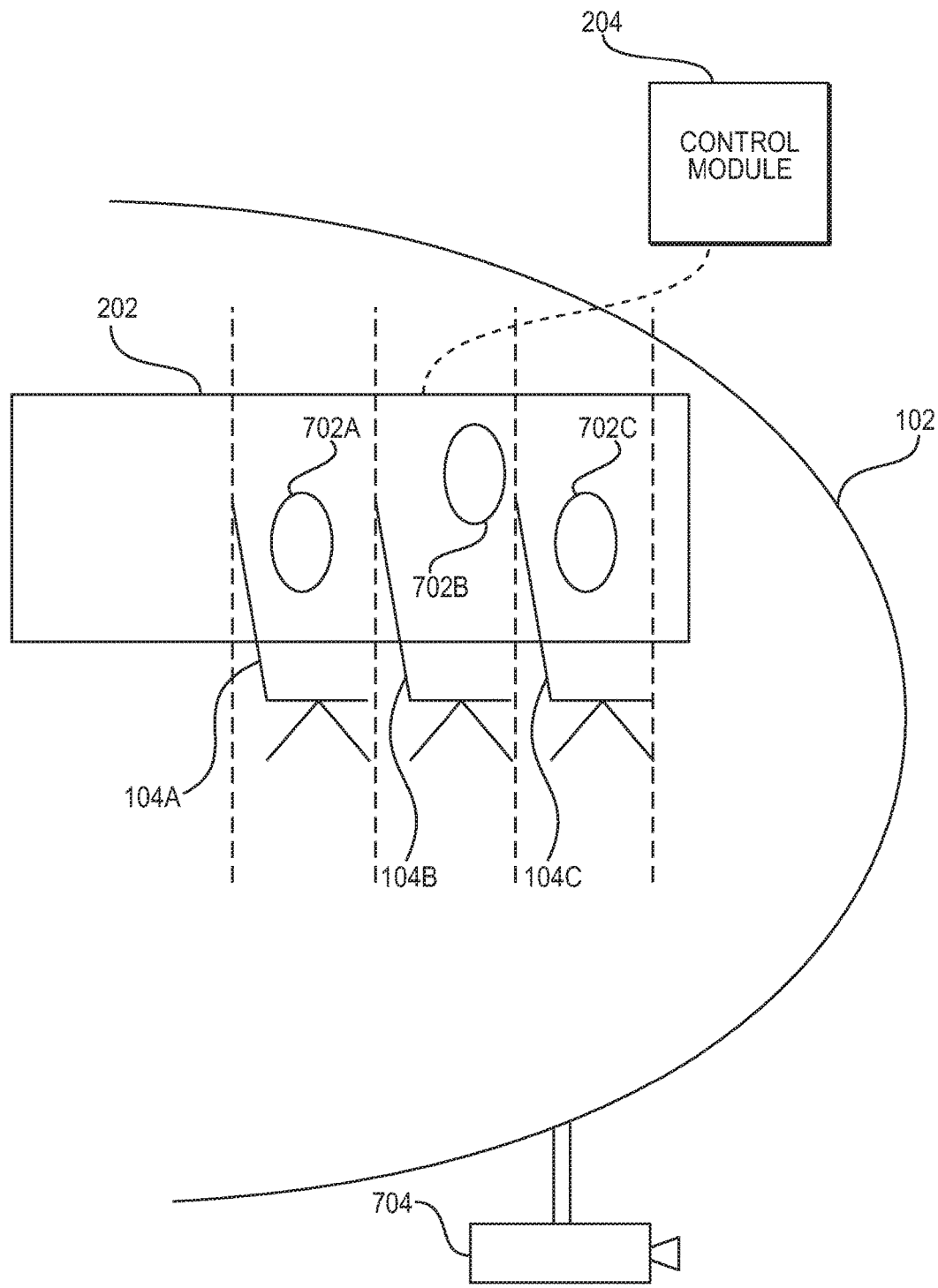
FIG. 7b is a schematic illustration of virtual windows that are displaceable, provided on the display device in between the virtual boundaries, in accordance with one embodiment.
Figure 7C:
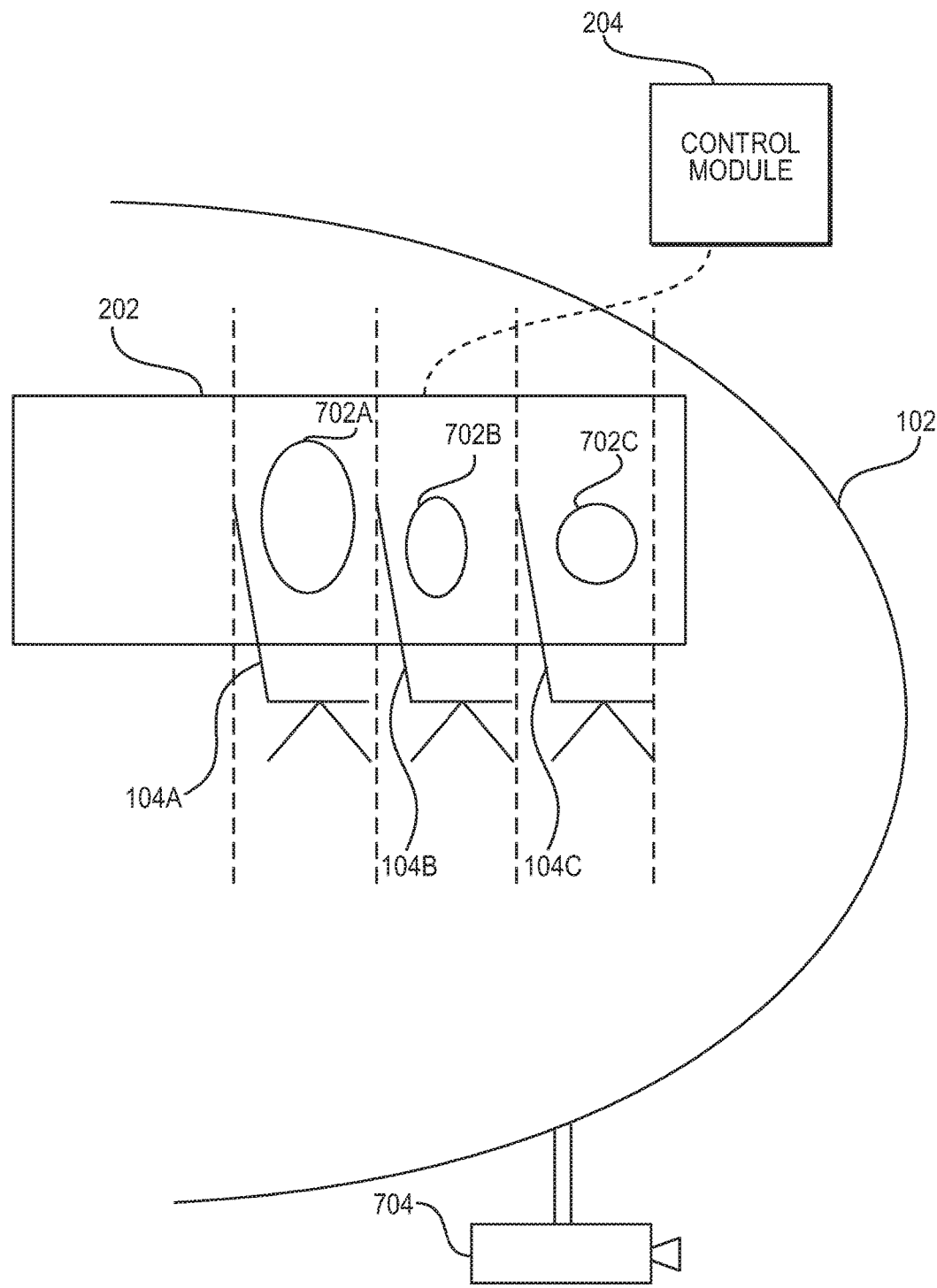
FIG. 7c is a schematic illustration of virtual windows that are scalable, provided on the display device in between the virtual boundaries, in accordance with one embodiment.
Figure 7D:
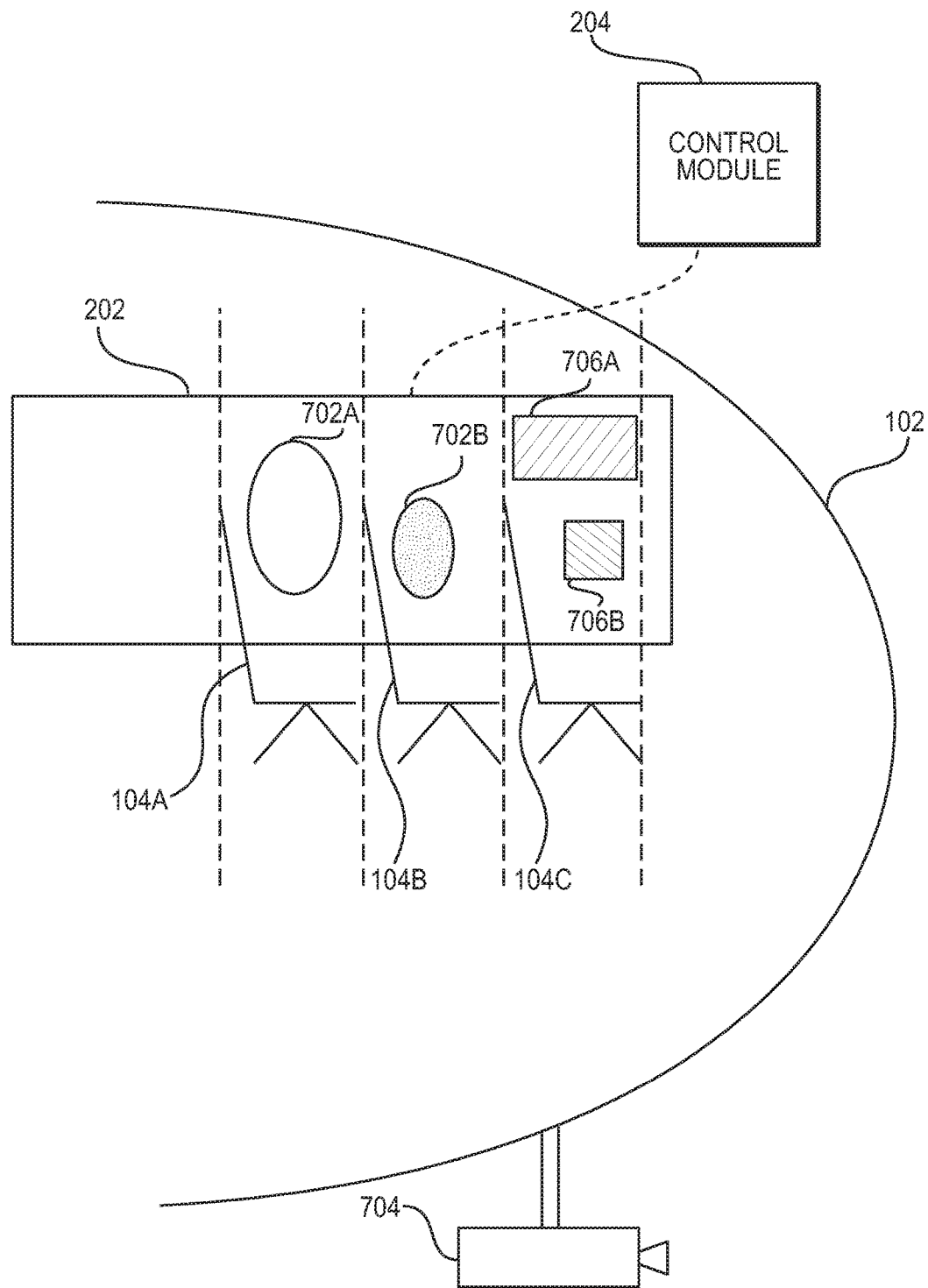
FIG. 7d is a schematic illustration of using the display device as an in-flight entertainment system, in accordance with one embodiment.

In some embodiments, the virtual windows 702a, 702b, 702c are adjustable in position, size, and shape by the passengers to allow each passenger to customize his/her virtual window individually. In the example illustrated in FIG. 7b, window 702b has been moved to a different height, providing the passenger a better vantage point depending on his or her specific height. In the example of FIG. 7c, window 702a has been resized and window 702c has been modified to be circular instead of elliptical. In the example of FIG. 7d, window 702b has been modified to display a digital representation of a closed shade on a structural window in order to block out the exterior view, or of a percentage of transparency/opacity variable between 0 and 100%.

The user-specific regions may be used as an in-flight entertainment system. Audio entertainment and video entertainment may be provided at large or on an individual basis in the aircraft. In-flight movies, television, games, and other on-demand content may be provided. A moving map system providing real-time flight information may also be provided. As illustrated in FIG. 7d, the virtual window may be removed and replaced by other content for display. For example, the passenger in seat 104c has removed the virtual window in his/her user-specific region and has opted to display a movie 706a, while tracking the progress of the flight 706b. Any changes made to what is displayed on the display device 202 in each user-specific region is confined to the space defined by the virtual boundaries 402a, 402b, 402c, 402d. The passengers may scale and position content within the virtual boundaries as desired and configuration of content in the space defined by one set of virtual boundaries does not affect the content in adjacent spaces.

Figure 8:
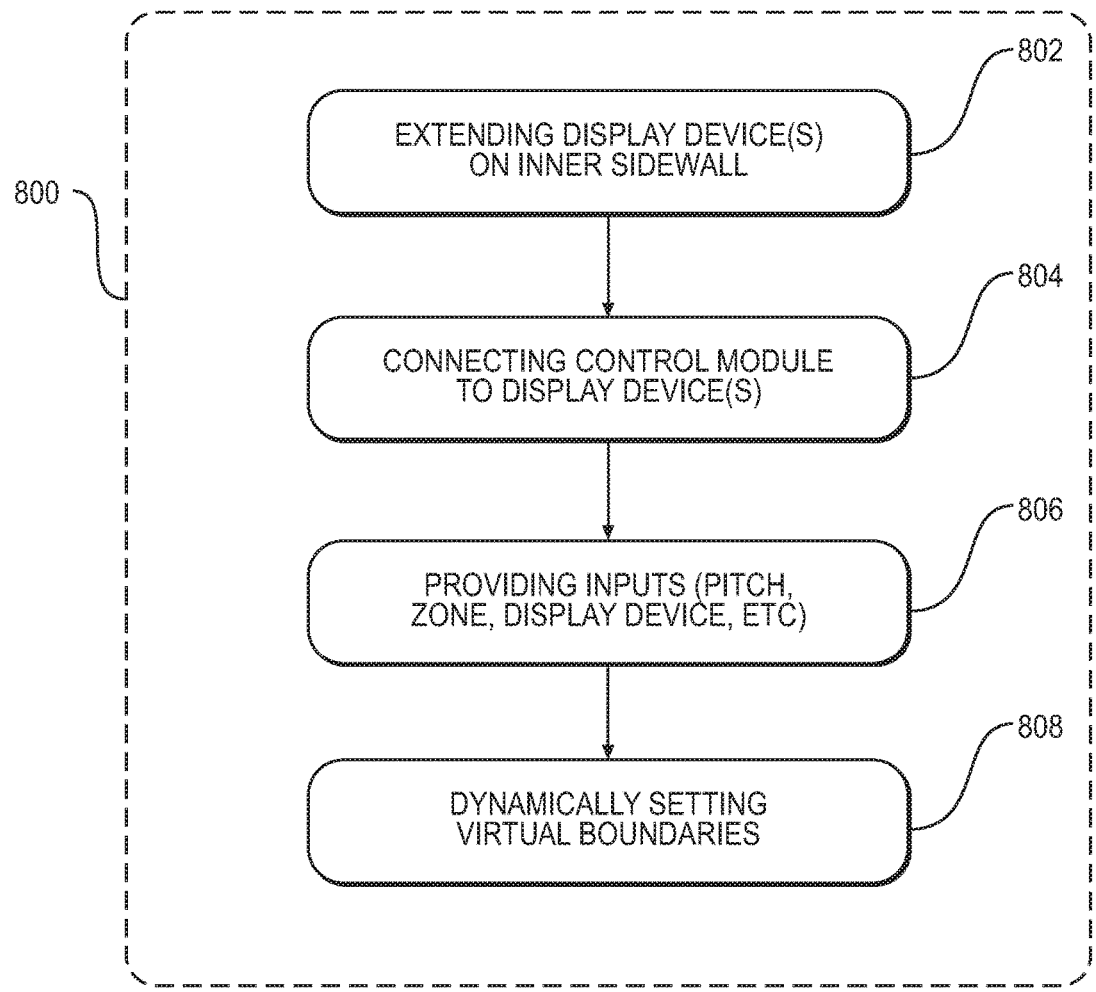
FIG. 8 is a flowchart of an exemplary method for providing an interactive sidewall display system.

Referring to FIG. 8, there is illustrated a method 800 for providing an interactive sidewall display system. In a first step 802, at least one display device 202 is extended along the inner sidewall of the aircraft 102 to span a plurality of seat 104a, 104b, 104c disposed in successive rows. As per step 804, the display device 202 is then connected to the control module 204 for communication therebetween. Once connection is made, inputs may be provided 806 to the control module 204. The inputs may be manual, such as a member of the flight crew entering information into a graphical user interface. The inputs may also be obtained by the control module 204 itself using pre-configured settings. For example, data regarding seat pitch, display devices, zones, etc, may be saved in the memory 302 of the control module 204 and once activated, the application 306a may be configured to cause the processor to access the memory and retrieve the settings for the aircraft. The application 306a may also be configured to access data remote to the control module 204 via a network or an electrical connection to other systems within the aircraft. The method 800 is completed by dynamically setting the virtual boundaries 808 on the display device 202 from the control module 204. The boundaries define the user-specific regions for passenger interaction at each row of the aircraft.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. It should be noted that the present invention can be carried out as a method and can be embodied in a system or on a computer readable medium. The embodiments of the invention described above are intended to be exemplary only. The scope of the invention is therefore intended to be limited solely by the scope of the appended claims.

The invention claimed is:

1. An interactive sidewall display system, comprising:
   at least one display device extending along an inner sidewall of a vehicle and spanning at least two seats disposed in successive rows, the display device being responsive to input commands from passengers for displaying information and images thereon; and
   a control module operatively connected to the at least one display device and configured to set at least one virtual boundary for the at least one display device as a function of seat pitch between the successive rows, the virtual boundary defining user-specific regions for passenger interaction with the display device, wherein the at least one virtual boundary is a substantially vertical boundary that separates the display device into the user-specific regions;

wherein the control module is configured to receive as input one of a selection of seats defining a zone and a zone comprising a set of pre-selected seats, and the seat pitch for seats of the zone, and set the at least one virtual boundary as a function of the seat pitch for the zone.

2. The system of claim 1, wherein the control module is configured to determine the seat pitch between the successive rows and set the at least one virtual boundary as a function of the seat pitch.

3. The system of claim 1, wherein the control module is configured to receive as input the seat pitch between the successive rows, and set the at least one virtual boundary as a function of the seat pitch as received.

4. The system of claim 1, wherein the control module is configured to apply virtual boundaries to a plurality of zones in the vehicle, each one of the zones defining a set of seats, wherein the virtual boundaries in a first zone define regions of a size that differs from the virtual boundaries in a second zone.

5. The system of claim 4, wherein the first zone comprises a plurality of successive rows, the second zone is adjacent to the first zone and comprises a single row, and a third zone adjacent to the second zone comprises a plurality of successive rows, the virtual boundaries in the first and the third zones defining regions of a size that differs from the virtual boundaries in the second zone.

6. The system of claim 4, wherein at least two of the plurality of zones span a same display device.

7. The system of claim 1, wherein the at least one display device comprises a plurality of display devices and the control module is configured to receive as input a selected display device from the plurality of display devices for applying the at least one virtual boundary thereto.

8. The system of claim 1, wherein the at least one display device and the control module comprise wireless transmission means for communicating together.

9. The system of claim 1, wherein the control module is configured to display borders on the display device at the at least one virtual boundary to visually define the user-specific regions.

10. A method for providing an interactive sidewall display system, the method comprising:
extending at least one display device along an inner sidewall of a vehicle to span at least two seats disposed in successive rows, the display device being responsive to input commands from passengers for displaying information and images thereon;
operatively connecting a control module to the at least one display device;
setting at least one virtual boundary on the at least one display device from the control module as a function of seat pitch between the successive rows, the at least one virtual boundary defining user-specific regions for passenger interaction, wherein the at least one virtual boundary is a substantially vertical boundary that separates the display device into the user-specific regions; and
receiving as input one of a selection of seats defining a zone and a zone comprising a set of pre-selected seats, and the seat pitch between the successive rows of the zone, and setting the at least one virtual boundary as a function of the seat pitch for the zone.

11. The method of claim 10, wherein setting the at least one virtual boundary comprises determining the seat pitch between the successive rows.

12. The method of claim 10, wherein setting the at least one virtual boundary comprises receiving as input the seat pitch between the successive rows.

13. The method of claim 10, wherein setting the at least one virtual boundary comprises applying virtual boundaries to a plurality of zones in the vehicle, each one of the zones defining a set of seats in successive rows, wherein the virtual boundaries in a first zone define regions of a size that differs from the virtual boundaries in a second zone.

14. The method of claim 13, wherein the first zone comprises a plurality of successive rows, the second zone is adjacent to the first zone and comprises a single row, and a third zone adjacent to the second zone comprises a plurality of successive rows, the virtual boundaries in the first and the third zones defining regions of a size that differs from the virtual boundaries in the second zone.

15. The method of claim 13, wherein at least two of the plurality of zones span a same display device.

16. The method of claim 10, wherein extending at least one display device comprises extending a plurality of display devices and further comprising receiving as input a selected display device from the plurality of display devices to the control module for applying the at least one virtual boundary thereto.

17. The method of claim 10, wherein operatively connecting a control module to the at least one display device comprises connecting the control module and the at least one display device wirelessly.

18. The method of claim 10, further comprising displaying borders on the display device at the at least one virtual boundary to visually define the user-specific regions.

19. A method for providing an interactive sidewall display system having at least one display device extending along an inner sidewall of a vehicle and spanning at least two seats disposed in successive rows, the at least one display device being responsive to input commands from passengers for displaying information and images thereon, the method comprising setting at least one virtual boundary on the at least one display device as a function of seat pitch between the successive rows from a control module operatively connected to the at least one display device, the at least one virtual boundary defining user-specific regions for passenger interaction, wherein the at least one virtual boundary is a substantially vertical boundary that separates the display device into the user-specific regions, and receiving as input one of a selection of seats defining a zone and a zone comprising a set of pre-selected seats, and the seat pitch between the successive rows of the zone, and setting the at least one virtual boundary as a function of the seat pitch for the zone.

* * * * *